Jan. 3, 1956     J. D. PATTERSON     2,729,046
NUT AND FRUIT HARVESTER
Filed Aug. 20, 1954
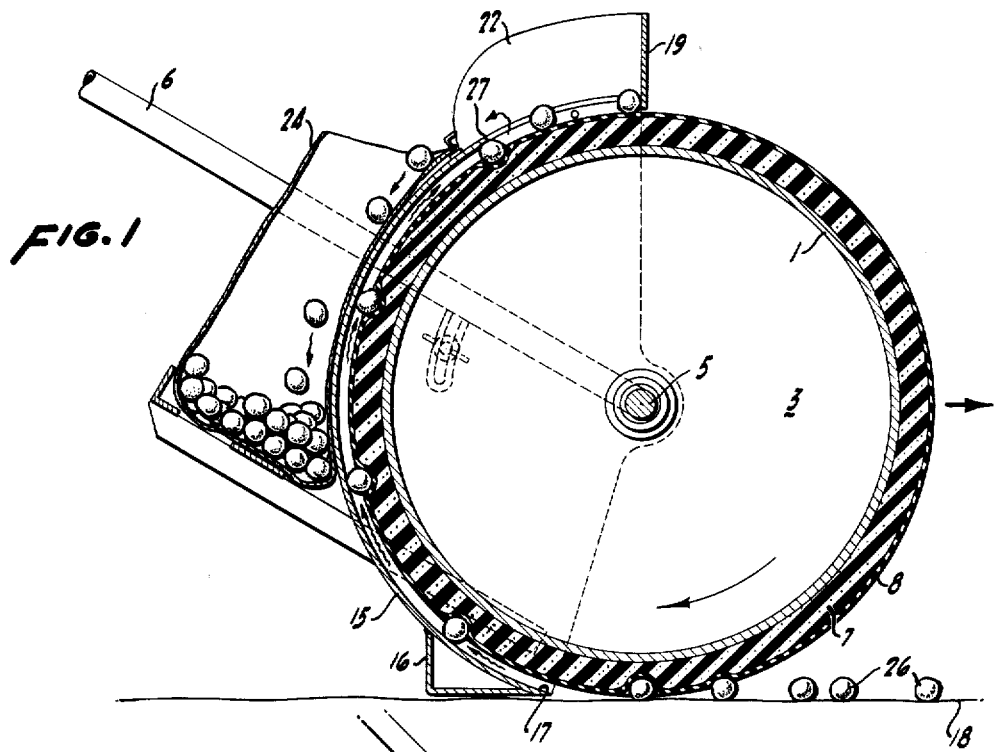
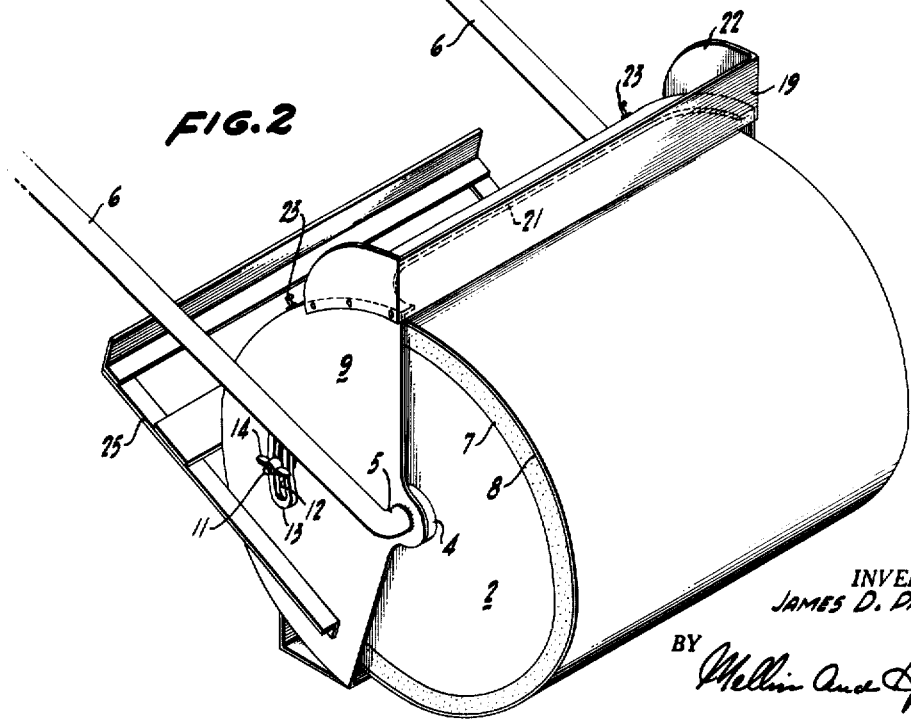
INVENTOR.
JAMES D. PATTERSON
BY *Mellin and Hanson*
ATTORNEYS

United States Patent Office 2,729,046
Patented Jan. 3, 1956

2,729,046

NUT AND FRUIT HARVESTER

James D. Patterson, Woodland, Calif.

Application August 20, 1954, Serial No. 451,245

7 Claims. (Cl. 56—328)

This invention relates to and in general has for its object the provision of a nut and fruit harvester or conveyor.

Certain crops, such as walnuts, and drupaceous fruits, such as prunes, are harvested from the ground either manually or by mechanical harvesters. Although the use of mechanical harvesters dispenses with the back-breaking work entailed in manually harvesting such crops, most of such mechanical harvesters pick up a lot of dirt along with the nuts or fruit being gathered.

It is therefore one of the objects of this invention to provide a harvester for gathering nuts and fruit from the ground so constructed that the entrainment of loose dirt and debris with the crop being harvested is avoided.

More specifically, it is the object of this invention to provide a harvester including an endless blanket or foam rubber-like material arranged to travel in a closed orbit over the ground; and a ramp disposed adjacent the rising side of the endless blanket and spaced therefrom a distance less than the smallest diameter of the nuts or fruit to be harvested whereupon objects embedded in said blanket as the blanket moves over the ground are trapped between the blanket and the ramp, forced up the ramp in response to the movement of the blanket and dropped into a receptacle fixed along the upper edge of the ramp.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings:

Fig. 1 is an elevational view with parts broken away and shown in section of a harvester embodying the objects of my invention.

Fig. 2 is a perspective view of the harvester illustrated in Fig. 1.

The harvester shown in these drawings comprises a hollow metal cylinder 1 arranged to rotate about a horizontal reference line or axis and closed at each end by cylinder heads 2 and 3. Welded to each of the cylinder heads is a bearing bushing 4 and journaled in these bushings are the horizontally extending end portions 5 of a pair of parallel operating handles 6.

Circumscribing and fixed to the supporting cylinder 1 is a thick resilient cylindrical blanket 7 conveniently made of foam rubber or some comparable material. Circumscribing and fixed to the blanket 7 is a pliable and preferably flexible wear sheet 8 conveniently made of rubber or plastic and serving to protect the blanket 7, the lower portions of the blanket and its wear sheet being arranged as shown in Fig. 1 to track with the ground.

Journaled on each of the horizontal handle end portions 5 for rotation thereon is a sector-shaped plate 9 subtending an angle of something less than 180°. Fixed to each of the plates 9 is an outwardly extending screw 11 arranged to slide within an arcuate slot 12 formed in a finger 13 welded to the adjacent sector 9. Threaded over the end of each of the screws 11 is a wing nut 14 for securing its associated plate 9 in any desired angular position relative to the adjacent handle 6.

Surrounding the back or rising side of the cylinder 1 and fixed to the opposed plates 9 is a metal arcuate ramp 15. The ramp 15 should parallel the cylinder 1 and be spaced from the blanket 7 a distance somewhat less than the smallest diameter of the nut or fruit to be harvested. Welded across the lower edge of the ramp 16 is a reinforcing angle 16. Preferably the lower leading edge of the ramp is made into a cutting edge 17 capable of cutting into the ground 18.

Secured to the upper edges of the opposed plates 9 over the blanket 7 is a stop 19, the upper end of the ramp 15 being formed with a cutout 21 at this point. Optionally, upstanding side guide plates 22 can be secured to the plates 9 and stop 19. Fastened along each end of the ramp 15 is a hook 23 for suspending the upper end of a sack 24, the lower end of the bag being supported on a bracket 25 secured to and extending rearwardly from the plates 9.

Preparatory to operating the harvester above described, the position of the cutting edge 17 relative to the handles 6 is adjusted by the wing nut 14 so that when the harvester is trundled over the ground the edge 17 will just clear the ground or cut slightly into it. This adjustment of course depends on the height, etc. of the particular operator in question. As the blanket 7 travels over the ground, the nuts 26 lying in its path become embedded in the blanket and remain so until they have passed the upper edge 27 of the ramp 15 whereupon they fall rearwardly under the influence of gravity into the sack 24. During the upward travel of the nuts, they either slide along the ramp without moving relative to the blanket or roll over the ramp, in which case they of course also rotate with respect to the blanket. The clearance between the blanket and the ramp must be such as to constrain the nut or fruit being harvested to remain substantially embedded in the blanket throughout its travel over the ramp. Although objects smaller than the crop being harvested become embedded in the blanket as the blanket moves over the ground, they will be immediately released as they reach the cutting edge 17 of the ramp and remain in the lower end of the arcuate channel formed by the ramp and the blanket.

Since the weight of the harvester is distributed over a considerable area of the blanket, relatively soft crops, such as prunes, will not be damaged by the harvester as the blanket rolls over them.

From the above description, it will be seen that I have provided a harvester which: is of very simple construction and easy to operate; will discriminate between dirt and crops; and will do no injury to relatively soft crops, such as prunes.

Although the endless blanket as herein illustrated is of cylindrical form, because of simplicity of construction of its supporting cylinder, it can of course take other and equivalent forms.

Furthermore, although this device has been referred to as a nut and fruit harvester, this is not to be considered as a limitation, for the device will function very well to pick up golf balls from a driving range or the like.

Having thus described my invention, what I claim and desire to secure by Letters Patent is:

1. A conveyor for conveying articles comprising: an endless blanket of foam rubber-like material arranged to travel in a closed path about and in parallelism with a horizontal reference line; and a ramp paralleling a portion of said blanket in spaced relation thereto, the clearance between said blanket and said ramp being less than the smallest cross-sectional width of said articles.

2. A harvester comprising: an endless blanket of foam rubber-like material covered with a flexible sheet and arranged to travel about and in parallelism with respect to a horizontal reference line and having a descending and rising side, said blanket being adapted to be bodily translated in engagement with the ground thereby to cause said blanket to travel in a closed orbit; a ramp paralleling the rising side of said blanket, the lower edge of said ramp being located substantially at ground level and the clearance between said ramp and the adjacent portion of said blanket being less than the smallest cross-sectional distance across the crop to be harvested.

3. A crop harvester comprising: a cylinder; a blanket of foam rubber-like material fixed to and circumscribing said cylinder; a pliable sheet fixed to and circumscribing said blanket; a non-rotatable ramp mounted on said cylinder in parallelism with the rising side of said cylinder, said ramp being normally spaced from said sheet a distance less than the smallest diameter of the crop to be harvested and means for rolling said cylinder over the ground in tracking engagement therewith.

4. A conveyor comprising: an endless blanket of foam rubber-like material and having a rising side and a descending side, said blanket being arranged to travel in a closed path with a portion thereof in parallelism and in engagement with a relatively flat supporting surface; and a ramp disposed rearwardly of the rising side of said blanket and in parallelism with and positively spaced therefrom, the clearance between said ramp and the adjacent portion of said blanket being less than the smallest diameter of the article to be conveyed.

5. A fruit and nut harvester comprising: an endless blanket of a foam rubber-like material, means for constraining said blanket to travel in a closed path in parallelism with a horizontal reference line and with the lower portion thereof in contact with the ground, said blanket having a rising side and a descending side; a ramp paralleling the rising side of said blanket and spaced therefrom a distance less than the smallest diameter of the nuts or fruit to be harvested; and means for rolling said blanket along the ground.

6. A fruit and nut harvester comprising: a supporting cylinder; a cylindrical blanket of foam rubber-like material fixed to and circumscribing said supporting cylinder; an arcuate ramp paralleling the rising side of said cylindrical blanket and spaced therefrom a distance less than the smallest diameter of the nuts or fruit to be harvested; and means for moving said harvester along the ground.

7. A fruit and nut harvester comprising: a supporting cylinder; a cylinder head fixed to and extending across each end of said cylinder; radially extending handles having inner horizontal end portions journaled in said cylinder heads; a cylindrical blanket of a foam rubber-like material fixed to and circumscribing said supporting cylinder; a ramp supported by said horizontal end portions along the rising side of said cylindrical blanket and spaced therefrom a distance less than the smallest diameter of the nuts or fruit to be harvested; and a horizontally extending stop secured across the upper portion of said blanket.

References Cited in the file of this patent
UNITED STATES PATENTS

| 930,269 | Conrath | Aug. 3, 1909 |
| 1,650,796 | Kellogg | Nov. 29, 1927 |
| 2,143,020 | Markley et al. | Jan. 10, 1939 |
| 2,155,543 | Grignolo | Apr. 25, 1939 |
| 2,402,201 | Martin | June 18, 1946 |
| 2,643,754 | Doak | June 30, 1953 |

Notice of Adverse Decision in Interference

In Interference No. 88,022, involving Patent No. 2,729,046, J. D. Patterson, Nut and fruit harvester, final judgment adverse to the patentee was rendered May 23, 1957, as to claims 1, 4, 5, and 6.

[*Official Gazette June 25, 1957.*]